July 17, 1928.  1,677,582

P. H. CONKLIN

SEGMENTAL SLEEVE VALVE ENGINE

Filed April 6, 1927

Inventor
Philo H. Conklin.
By Faust F. Crampton
Attorney

Patented July 17, 1928.

1,677,582

UNITED STATES PATENT OFFICE.

PHILO H. CONKLIN, OF TOLEDO, OHIO.

SEGMENTAL-SLEEVE-VALVE ENGINE.

Application filed April 6, 1927. Serial No. 181,346.

My invention has for its object to produce a segmental sleeve valve internal combustion engine. In order to eliminate the double cylindrical rubbing surfaces of large area, and also to avoid registration of port openings commonly used in sleeve valve motors, I have provided a segmental sleeve that operates to open and close the ports of the engine which interconnect and bear only at the edges of the segments. The invention may be contained in internal combustion engines of different forms and used for a great variety of purposes, and to illustrate a practical application of the invention, I have selected a construction embodying the invention as an example of the various forms of constructions that contain the invention, and shall describe the selected construction hereinafter. The structure selected as an example is shown in the accompanying drawings.

Figures 1, 2, 3:
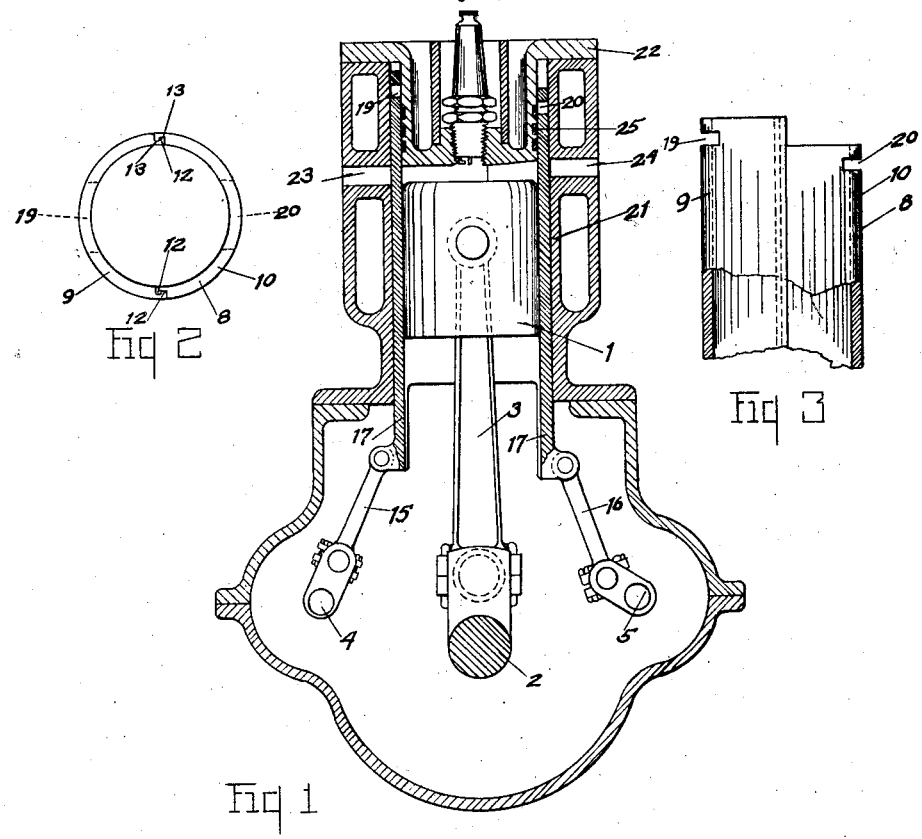
Figure 4:
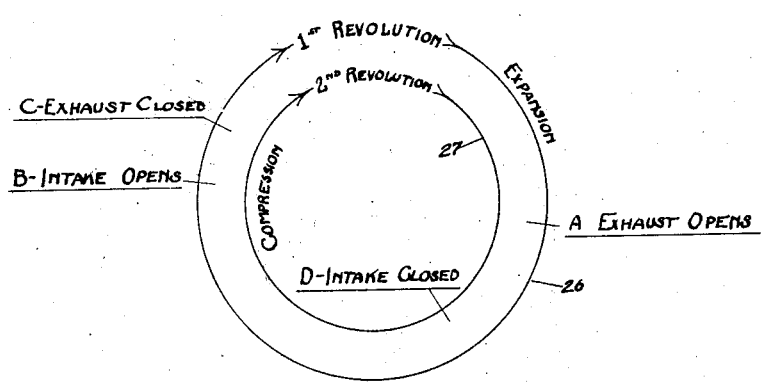

Fig. 1 is a view of a vertical section taken through a cylinder having the segmental sleeve valve. Fig. 2 is a top view of the sleeve. Fig. 3 is a side broken view of the valve. Fig. 4 is a diagram indicating the operation of the engine shown in Fig. 1.

The internal combustion engine shown in Fig. 1 of the drawings is provided with the usual piston 1, the crank shaft 2, and the interconnecting link 3. It has a pair of shafts 4 and 5 that correspond to the ordinary valve shafts of an engine and which make one-half the number R. P. M. that are made by the crank shaft 2. The shafts 4 and 5, however, are crank shafts which operate the segments of the sleeve valve.

The piston 1 is located within the segmental sleeve valve 8. The sleeve valve 8 is provided with two semi-cylindrical parts 9 and 10 that have over-lapping edge portions. The over-lapping edges of the segments are each provided with a ridge 12 and a channel 13 that interfit, the total thicknesses of the over-lapping edges being the same as the thickness of the body portions of the sleeve. Preferably, the ridges and channels have inter-fitting substantially square corners in order to produce a substantially perfect seal along their areas of contact. One segment of the sleeve, namely, the segment 9, is connected to the valve crank shaft 4 by means of the link 15 and the segment 10 is connected to the valve crank shaft 5 by means of the link 16. Preferably, the lower ends of the segments of the sleeve terminate in arms 17, to which the links 15 and 16 are connected. The upper ends of the segments are provided with openings 19 and 20 that extend over arcs of considerable magnitude in order to form large areas for the inlet and outlet of vapor and gases.

The sleeve valve 8 not only mechanically fits the exterior of the piston, but also mechanically fits the interior of the cylinder 21. The upper end of the segmental sleeve valve 8 is closed by means of the head 22 which extends into the upper end of the cylinder 21 to a point near the upper edges of the ports 23 and 24 and so as to give ample room for the movement of the upper ends of the segments of the sleeve valve 8 above the ports 23 and 24 during each stroke of the sleeve valve 8. The head 22 is provided with sealing rings 25 of the type well known in the art and commonly used in connection with engine pistons, and known as piston rings, for the purpose of preventing the escape of gases upwards from the piston between the sleeve 8 and the protruding part of the head 22. The segments 9 and 10, are, however, so actuated by the valve crank shafts 4 and 5 and the links 15 and 16, as to produce registration between the openings 19 and 20 of the sleeve valve 8 and the ports 23 and 24 of the engine cylinder when the segments are moved through the lower ends of their respective strokes. This is when the lower ends of the links 15 and 16 pass through a large arc of the circle described by the wrist pins of the crank shafts. By the arrangements shown in the drawings, the ports will be held open for a long period of time as compared to the strokes of the piston 1. The length of these periods are indicated in the diagram shown in Fig. 4.

The expansion and the exhaust periods are shown in the outer circle 26 and the intake and compression periods are shown in the inner circle 27. The exhaust begins at the point marked "A" and closes at the point marked "C", following very closely the opening of the intake, the full opening of the exhaust port 24 extending through a very large part of the arc between the points marked "A" and "C". The intake port 23 opens at the point marked "B" and closes at the point marked "D". The intake port is also wide open during a large part of this arc of the circle. Thus the intake port is just beginning to open as the exhaust port is practically closed and is closing. Both at the opening and the closing of the ports the movements of the segments are comparatively very rapid while during a larger part of the arcs, indicated in Fig. 4, between the opening and closing points, the movements of the segments are comparatively very slow, or the segments are practically standing still with the ports wide open and so, while the exhaust is brought to a complete closure subsequent to the time that the intake begins to open, as indicated in the figure, the ports are barely opened during this period and the segments are moving rapidly to close the exhaust and open the intake.

Thus I have provided an engine wherein the coaxial sleeves of the ordinary sleeve valve is entirely eliminated and the troubles due to oiling and uneven expansion are obviated. Also, registration of port openings as between the inner and outer sleeves of the double sleeve valve motor is avoided.

I claim:

1. In an internal combustion engine, a segmental sleeve having openings at its upper end, crank shafts and links for operating the segments of the sleeve to produce registration between the openings of the sleeve and the ports of the engine, the edge portions of the segments having interfitting ridges and grooves, the engine having a head extending into the upper end of the sleeve and having sealing rings for sealing the interior of the sleeve.

2. In an internal combustion engine, a segmental sleeve having openings at its upper end, crank shafts and links for operating the segments of the sleeve to produce registration between the openings of the sleeve and the ports of the engine, the segments having overlapping edge portions having a ridge extending along the edge of the segment and separated from the body of the segment a distance equal to its own width whereby channels are formed between the ridges and the body portions of the segments into which the ridges of the adjoining segments fit.

In witness whereof I have hereunto signed my name to this specification.

PHILO H. CONKLIN.